United States Patent [19]
Lannan et al.

[11] Patent Number: 6,014,729
[45] Date of Patent: Jan. 11, 2000

[54] SHARED MEMORY ARBITRATION APPARATUS AND METHOD

[75] Inventors: Gregory B. Lannan, Larkspur; Robert A. Schneiderwind, Castle Rock; Douglas N. Krening, Larkspur; Michael J. Schneiderwind, Castle Rock, all of Colo.

[73] Assignee: FirstPass, Inc., Castle Rock, Colo.

[21] Appl. No.: 08/939,783

[22] Filed: Sep. 29, 1997

[51] Int. Cl.[7] ........................................ G06F 13/18
[52] U.S. Cl. ..................... 711/150; 710/128; 710/129; 710/240; 710/200; 711/152
[58] Field of Search ................... 711/150, 148, 711/152, 158; 710/240–244, 40, 107–109, 126, 128–129, 200

[56] References Cited

U.S. PATENT DOCUMENTS

| | | | |
|---|---|---|---|
| 5,218,680 | 6/1993 | Farrell et al. | 395/325 |
| 5,304,860 | 4/1994 | Ashby et al. | 307/296.3 |
| 5,347,181 | 9/1994 | Ashby et al. | 307/465 |
| 5,361,392 | 11/1994 | Fourcroy et al. | 395/800 |
| 5,369,777 | 11/1994 | Gephardt et al. | 395/800 |
| 5,379,386 | 1/1995 | Swarts et al. | 395/325 |
| 5,418,930 | 5/1995 | Swarts | 395/500 |
| 5,758,166 | 5/1998 | Ajanovic | 710/240 |
| 5,790,815 | 8/1998 | Swanstrom et al. | 710/129 |
| 5,805,905 | 9/1998 | Biswas et al. | 710/244 |
| 5,828,856 | 10/1998 | Bowes et al. | 710/129 |
| 5,894,562 | 4/1999 | Moyer | 710/113 |
| 5,896,513 | 4/1999 | Fisch et al. | 395/527 |

OTHER PUBLICATIONS

Kenneth J. Schultz et al., "CAM–Based Single Shared Buffer ATM Switch", IEEE Transactions, pp. 1190–1195, 1994.

Nobuyuki Mizukoshi et al., "A Single Chip Controller For 1.2 Gbps Shared Buffer ATM Switches", IEEE Custom Integrated Circuits Conference, pp. 22.2.1–22.2.4, 1997.

*Primary Examiner*—John W. Cabeca
*Assistant Examiner*—Pierre-Michel Bataille
*Attorney, Agent, or Firm*—Thomas W. Hanson

[57] ABSTRACT

An apparatus and method for arbitrating requests for access to a shared resource. A buffer, on command from control logic, can selectively couple or decouple two buses. The control logic uses signals from two logic devices, one of which may be a microprocessor, and one of which may be a communications interface, to determine which of the devices is granted access to the shared resource. The control logic can generate an inhibit signal to the microprocessor to stall it while the second logic device is accessing the shared resource. Handshaking is used to control access by the second device to the shared resource.

1 Claim, 6 Drawing Sheets

| | Current State | Arbitration Input Signals | | | | | Next State | Arbitration Output Signals | | |
|---|---|---|---|---|---|---|---|---|---|---|
| | | DMAR_N | CS_N | MEMCSI_N | DS_N | DMACK_N | | DMAG_N | DTACK_N | SHBE_N |
| 1 | Processor (00) | 1 | 1 | 1 | X | X | Processor (00) | 1 | 0 | 1 |
| 2 | Processor (00) | 1 | 0 | X | X | X | Processor (00) | 1 | 0 | 0 |
| 3 | Processor (00) | 1 | 0 | 0 | X | X | Processor (00) | 1 | 0 | 0 |
| 4 | Processor (00) | 0 | 0 | X | 0 | X | Processor (00) | 1 | 0 | 0 |
| 5 | Processor (00) | 0 | 0 | 0 | 0 | X | Processor (00) | 1 | 0 | 0 |
| 6 | Processor (00) | 0 | 1 | 1 | X | X | 1553 I/F (01) | 0 | 0 | 1 |
| 7 | Processor (00) | 0 | 0 | X | 1 | X | 1553 I/F (01) | 0 | 1 | 1 |
| 8 | Processor (00) | 0 | X | 0 | 1 | X | 1553 I/F (01) | 0 | 1 | 1 |
| 9 | 1553 I/F (01) | 0 | 1 | 1 | X | 1 | 1553 I/F (01) | 0 | 1 | 1 |
| 10 | 1553 I/F (01) | 0 | 0 | X | X | 1 | 1553 I/F (01) | 0 | 1 | 1 |
| 11 | 1553 I/F (01) | 0 | X | 0 | X | 1 | 1553 I/F (01) | 0 | 1 | 1 |
| 12 | 1553 I/F (01) | X | 1 | 1 | X | 0 | 1553 I/F (01) | 1 | 0 | 1 |
| 13 | 1553 I/F (01) | X | 0 | X | X | 0 | 1553 I/F (01) | 1 | 0 | 1 |
| 14 | 1553 I/F (01) | X | X | 0 | X | 0 | 1553 I/F (01) | 1 | 0 | 1 |
| 15 | 1553 I/F (01) | 1 | 1 | 1 | X | X | Processor (00) | 1 | 0 | 1 |
| 16 | 1553 I/F (01) | 1 | 0 | X | X | X | Processor (00) | 1 | 1 | 0 |
| 17 | 1553 I/F (01) | 1 | X | 0 | X | X | Processor (00) | 1 | 1 | 0 |

FIG. 6

SHARED MEMORY ARBITRATION APPARATUS AND METHOD

FIELD OF THE INVENTION

The invention relates to a data transfer mechanism between two autonomous devices. More particularly, it relates to an arbitrated access mechanism which provides access to shared memory.

BACKGROUND OF THE INVENTION

Real-time systems are often used to control and monitor other systems such as chemical processes, aircraft flight controls, spacecraft, and automobile engines. A real-time system is characterized by the requirement that the system complete some or all of its tasks before the occurrence of an external event which occurs at a fixed time. Often the tasks and the external events are periodic. The implication of this is that the processing performed by the system must be fast, and more importantly, predictable in duration. Significant variations in the amount of time required to perform a task, from one invocation to another, are not acceptable.

It is becoming increasingly common to build real-time systems using a distributed architecture. In a distributed system, the processing is divided between more than one hardware processor. The processors are interconnected by a communications bus, or network, to provide sharing of data and cooperation between the processors. Often, the communications across the bus is one of the slowest parts of the processing. Variations in the timing of the communication are most likely to impact the overall response time. One source of delay is when a first processor is busy when a second processor needs to communicate with it. The second processor will be stalled until the first processor becomes available.

One solution is to provide a secondary device, a communications interface, associated with the processor, which is dedicated to handling the communications. It will accept data from the communications bus and make it available to the processor, and accept data from the processor and transmit it over the bus. Often, the mechanism used to transfer data between the processor and the communications interface becomes the bottleneck. This transfer mechanism is a shared resource which can only be used by one of the processor or the communications interface at a time. If it is in use by the processor, the communications interface can not operate, and the communications over the bus is again stalled.

In some applications, such as spacecraft system, electrical power is in limited supply. One method used to conserve this resource is to power down hardware which is not in use, such as the distributed processors. However, it would be desirable that communications with the device still be available while the processor is powered down.

In some implementations, the processor and the communications interface are built into the same integrated circuit chip. However, the capability may be provided to disable the processor portion of the chip and couple the chip to an external processor. The communications interface needs to operate normally, transferring data to and from the external processor.

There is a need for a bi-directional data transfer mechanism between a processor and a communications interface. The transfer mechanism must give first priority to the communications interface; it must work with the processor powered down, allowing the communications interface to function; and, in a single chip implementation, it must also work with an external processor when the internal processor is disabled.

SUMMARY OF THE INVENTION

The present invention discloses an apparatus and method for resolving the conflicts between two logic devices which are contending for access to the same shared resource. In the preferred embodiment, one of the logic devices is a microprocessor and the other is a communications device and each is connected to a separate communications bus. The shared resource, such as shared memory, is connected to one of the buses. A switchable buffer is connected to both buses. When enabled, the buffer connects the two buses, allowing data to be exchanged between the buses. Control logic uses input signals from the two logic devices to determine which is allowed access to the shared resource. The control logic generates a signal which enables the buffer and can also generate signals to the logic devices to grant them access to the shared resource or to inhibit them from operating. In the preferred embodiment, the control logic implements rules which provide a preference to the communications interface over the microprocessor.

In a further embodiment of the invention, there may be a second shared resource, accessible through the same bus, access to which can also be arbitrated.

In a further embodiment of the invention, one of the logic devices can be disabled and the control signals connected to it, made available to a device external to the integrated circuit on which the present invention is located. The present invention can then work with the external device to arbitrate its requests to the shared resource via an external bus connection.

The present invention provides a buffered, bi-directional connection between two buses. Shared memory, or another shared resource, is coupled to one of the buses and is available for reading or writing by devices connected to either bus. Control logic communicates with the requesting devices and arbitrates their access requests to shared memory utilizing rules, implemented as a state machine, which give a preference to one device over the other. The control logic can also work with a device external to the chip on which it is implemented.

BRIEF DESCRIPTION OF THE DRAWINGS

FIG. 6 is a logic state table for the invention.

DETAILED DESCRIPTION OF THE INVENTION

The following discussion focuses on the preferred embodiment of the invention, in which it is embedded within an ASIC which functions as a flexible, modular interface between a subsystem and the system bus. However, as will be recognized by those skilled in the art, the disclosed method and apparatus are applicable to a wide variety of situations in which arbitration of access to a shared resource is desired.

The following is a brief glossary of terms used herein. The supplied definitions are applicable throughout this specification and the claims unless the term is clearly used in another manner.

ASIC—application specific integrated circuit.

C & DH—Command and Data Handling subsystem.

ESN—Essential Services Node. A single chip ASIC interface between a subsystem and the system bus.

UTMC—United Technologies Microelectronics Center, Inc.

MIL-STD—Military Standard. Equipment specifications, such as those propagated by the Department of Defense.

MIL-STD-1553, MIL-STD-1773 —specifications for a serial communications interface. Both use the same protocol, but they differ in their medium. 1553 uses twisted, shielded copper pair or co-axial cable while 1773 uses fiber optic. A communications interface that supports the protocol can work with either type of bus by substituting the appropriate transceiver. Herein, where 1553 is used it is generally understood to include either 1553, 1773, or both.

Bus Controller, Remote Terminal—terms specific to the MIL-STD-1553/1773 serial bus. The Bus Controller controls, or directs, all communications on the bus. A Remote Terminal sends and receives data only when commanded by the Bus Controller.

Signal—logical information either as an electrical signal on a single wire or encoded as a data pattern on multiple wires or other communication media.

The various drawing figures disclose the present invention in detail showing the preferred embodiment. The following discussion is with reference to these figures.

Figure 1:
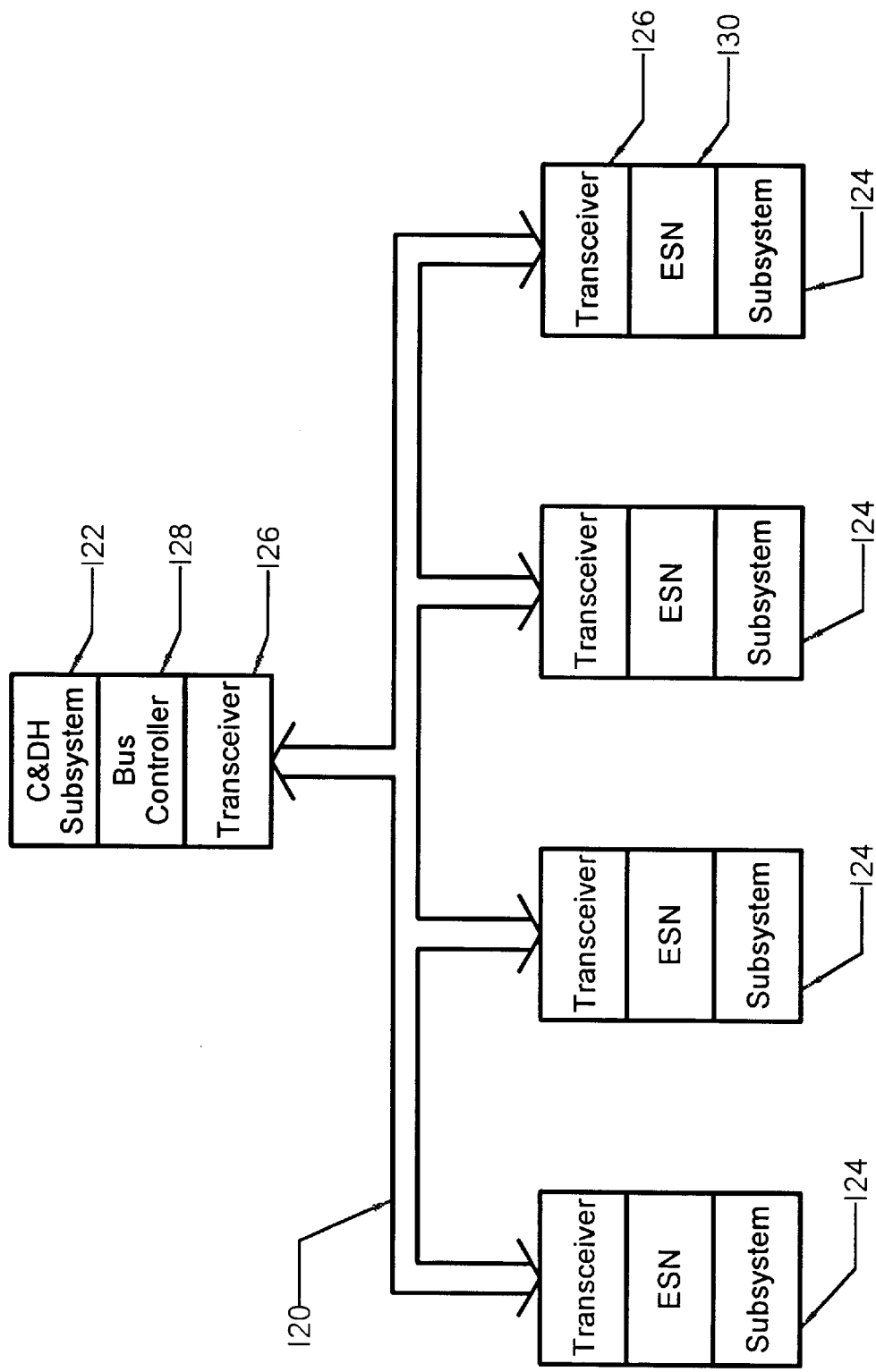
FIG. 1 is a block diagram showing the system environment in which the present invention is used.

FIG. 1 provides a high level view of a spacecraft system. A common system architecture will use a system bus, 120, to provide communications between the subsystems. Often, a MIL-STD-1553 bus is used as the system bus with the C&DH subsystem, 122, is established as the bus controller or bus master. It maintains control over all communications that take place on the system bus. Each of the other subsystems, 124, are passive participants on the systems bus, transferring data only when told to do so by the bus controller. In MIL-STD-1553 terminology, they are "remote terminals." The subsystems must respond within a limited time to meet the timing constraints imposed on the system as a whole. Each of the subsystems, C&DH included, uses a transceiver, 126, to provide an electrical (or optical) coupling to the system bus. Connected to the transceiver will be the component that provides the logical, or protocol, interface to the bus. In the C&DH subsystem, this is the bus controller, 128. For the other subsystems, this functionality can be provided by a custom ASIC, known as the Essential Services Node (ESN), 130. The present invention is utilized within the ESN to handle communications with the system bus.

Figure 2:
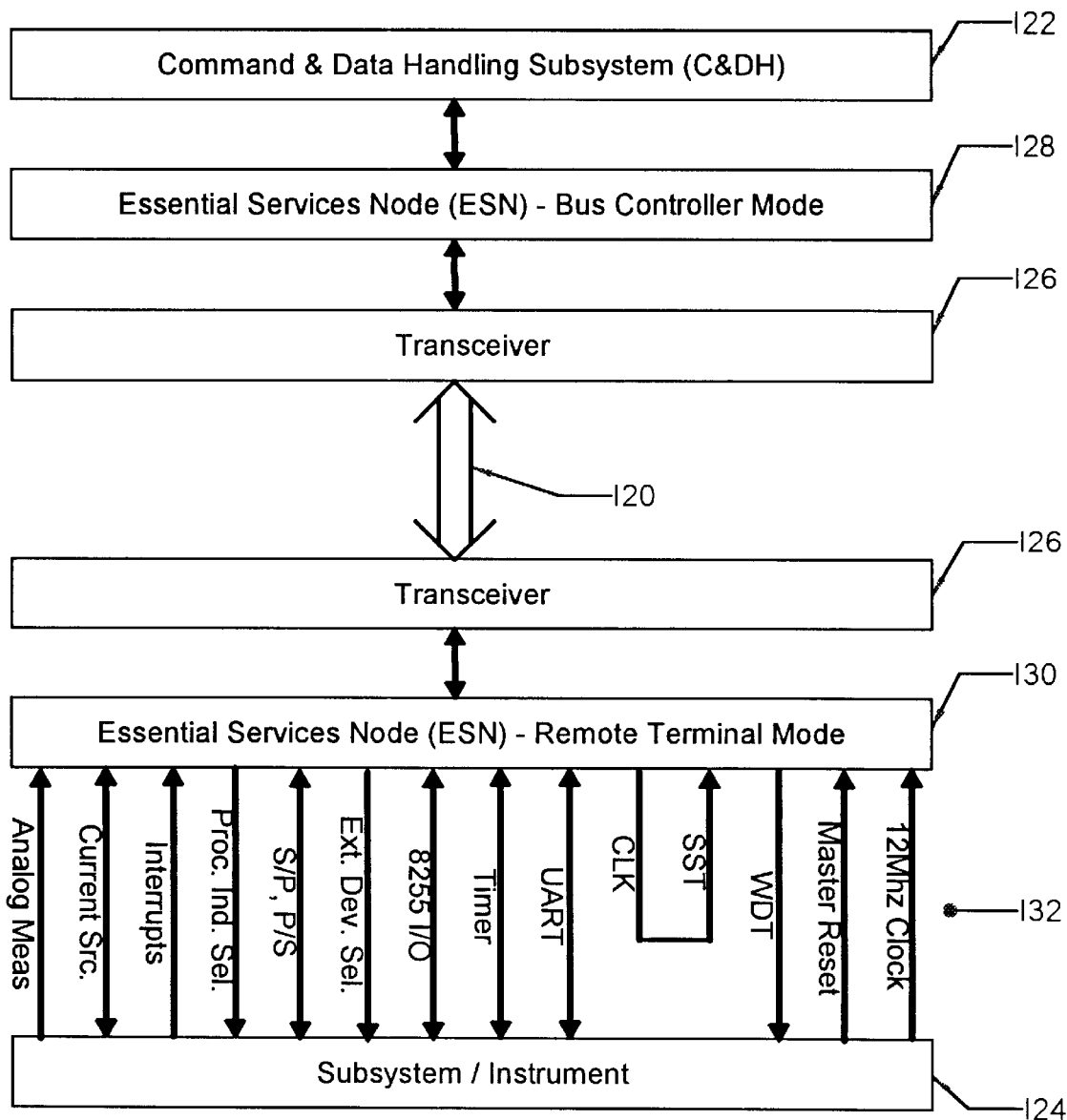
FIG. 2 is a block diagram providing a more detailed view of the communications path in which the present invention is used.

FIG. 2 provides a more detailed view of the architecture as it pertains to the communications between the C&DH and one of the subsystems. As illustrated, the ESN, including the present invention, can also function as a bus controller in the C&DH subsystem, 128, when configured for bus controller mode. The ESN, configured as a remote terminal, 130, is also used in the client subsystem, 124. The bus controller and remote terminal communicate via the transceivers, 126, and the system bus, 120. The ESN in the client subsystem provides an interface to the system bus. On one side, it fills the role of remote terminal to the 1553 bus and on the other it communicates with the client subsystem. In order to maintain the required response times, the ESN must be able to handle data transfers over the bus simultaneously with communications with the client subsystem or internal processing of those requests. The present invention provides the coupling, internal to the ESN, between the processor and the bus communications interface, which makes this possible.

Figure 3:
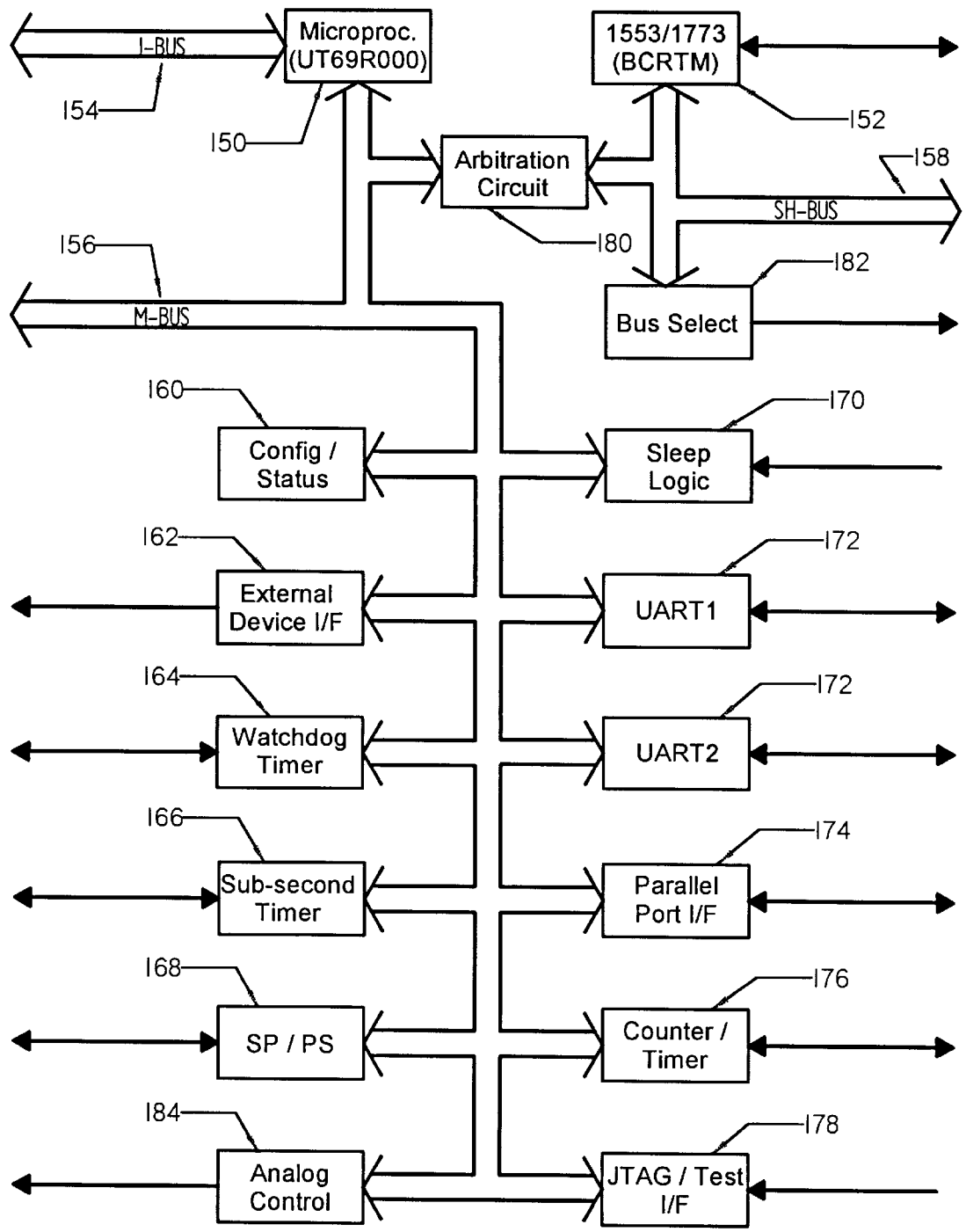
FIG. 3 is a block diagram of an ESN ASIC in which the preferred embodiment of the present invention is used.
Figure 4:
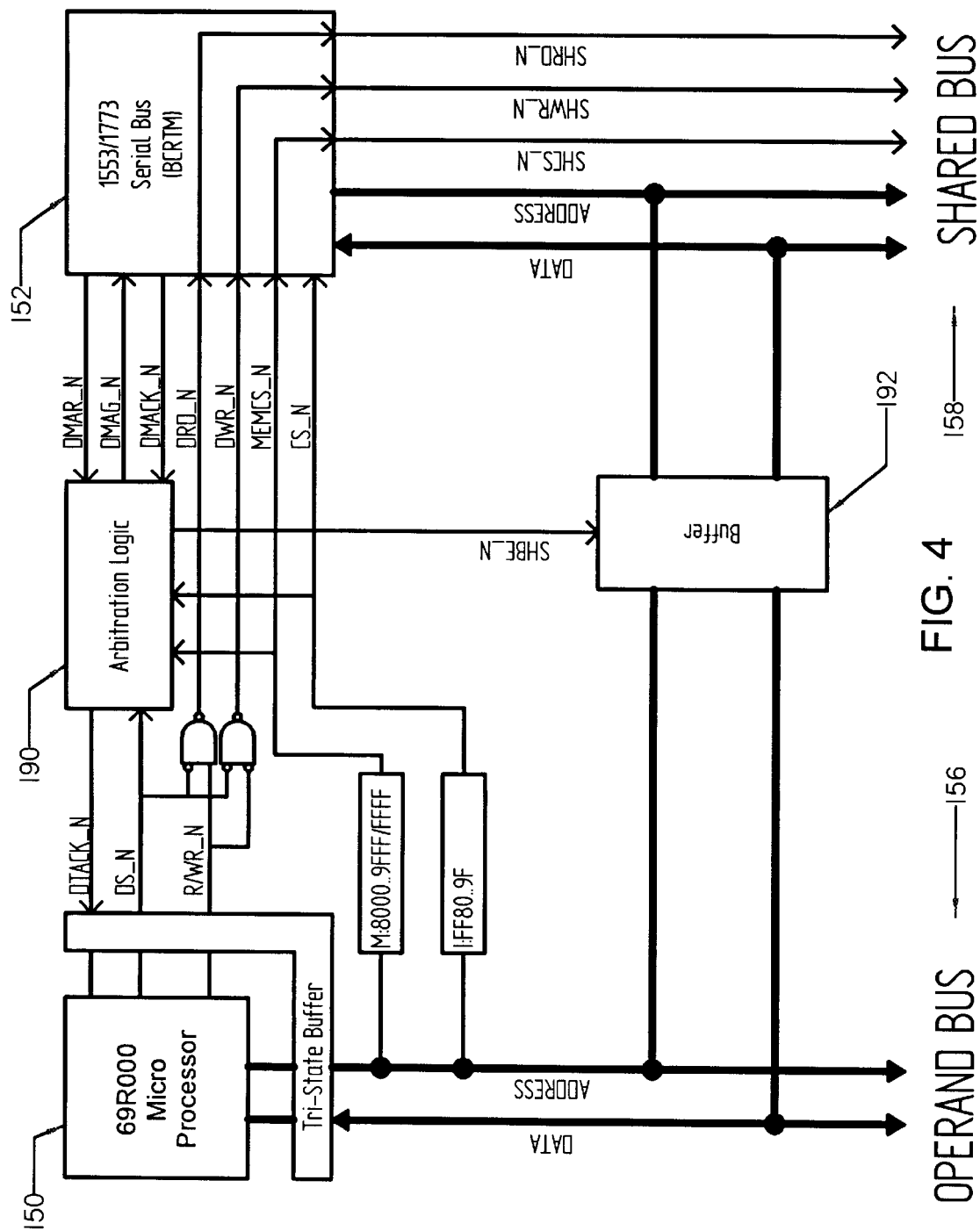
FIG. 4 is a block diagram of the invention illustrating the major components.

FIG. 3 provides a block diagram of the internal architecture of the ESN ASIC. The most important components of the ASIC, from a functional perspective, are the microprocessor controller, 150; the MIL-STD-1553/1773 interface, 152; the buses, 154, 156, and 158; and the communications interfaces, 162, 168, 172, and 174. In addition, the ASIC includes various support devices. RAM and ROM are provided external to the ASIC to allow for more flexible configuration. Four sets of memory are required: program ROM; program RAM; data RAM; and shared RAM. The present invention utilizes the arbitration circuit, 180, the M-bus, 156, the SH-bus, 158, and the external shared RAM to provide communication between the micropricessor and the 1553 interface.

The MIL-STD-1553/1773 serial interface, 152, provides a connection to the system bus. In normal operation, the 1553 interface transfers data between the system bus and shared memory. Transfers to and from shared memory by the 1553 interface are independent of, and can proceed in parallel with, microprocessor transfers over the instruction and operand buses.

In the preferred embodiment, the 1553 interface is implemented using UTMC's BCRTM design. Operating at up to 12 MHz, this interface can be configured as a bus controller, remote terminal, or bus monitor and has a 64 KW address space. This flexibility allows the ESN to be used as either a bus controller or as a remote terminal, as described above.

The microprocessor, 150, provides data processing capability as a part of ESN's interface functionality. The microprocessor handles the input and output of data over the I/O devices and can provide manipulation of the data. That data which needs to be transferred to or from the C&DH subsystem is transferred between the microprocessor and the 1553 interface via the present invention.

In the preferred embodiment, the microprocessor is a 16 bit UTMC UT69R000 RISC micro-controller. This processor is a Harvard architecture machine with 1 MW of instruction space and two 64 KW data pages. One of the data pages is used for data storage and the other is used to access I/O devices. The processor operates at two clock cycles per instruction resulting in 8 MIPs performance at 16 MHz. As a static machine, the system clock can be stopped to reduce the power requirements. The processor has 15 levels of interrupts, two 16-bit timers, two discrete inputs, eight discrete outputs, DMA support and a built-in 9600-baud UART.

For increased flexibility, the ESN ASIC utilizes three independent 16-bit data buses. The instruction bus (I-bus), 154, is accessible only by the microprocessor and provides a dedicated connection to program RAM and boot ROM. This allows fast, no contention instruction loading by the processor. The shared bus (SH-bus), 158, provides a connection between shared memory and the 1553 interface. The operand bus (M-bus), 156, provides the processor with connections to data RAM, and to the I/O devices on the ASIC. The connection between the processor and the M-bus utilizes tri-state buffering to allow the processor to be isolated from the operand bus. This capability, combined with the fact that the M-bus is accessible through external pins on the ASIC, provides the ability to disable the internal processor and control the operand bus with an external device.

The M-bus and the SH-bus are coupled by the arbitration circuitry of the present invention. This provides the processor with access to shared memory allowing it to load and store data and to transfer data between the 1553 interface and the I/O devices. The arbitration circuitry is comprised of two major components: the arbitration logic, 190; and the buffer, 192. Because the ability to disable the processor and use an external processor is present in the preferred embodiment, the arbitration scheme must be able to work with both an internal and an external processor. This capability is enabled by providing the connection between the buses, instead of to the processor, and by making the signals passed between the processor and the arbitration logic available on external pins.

The buffer, 192 is a dual port configuration which provides access by the processor, via the M-bus, to shared memory when enabled. In the preferred embodiment, the interface is a one-to-one connection between both the data and address lines of the M-bus and the SH_Bus with the exception of address bit 15. On the M-bus side, address line 15 is grounded, setting the SH-bus address bit 15 to 0 when the buffer is enabled. This has the effect of mapping M-bus addresses in the range 8000-FFFF to SH-bus addresses of 0000-7FFF. In combination with the logic which generates MEMCSI_N this allows a page of the M-bus address space to be mapped to the shared memory space. It would be clear to a person skilled in the art that other mappings, including a full 16 bit one-to-one map, would be possible and do not alter the functioning of the present invention.

The arbitration logic, 190, serves to resolve contention between the processor and the 1553 interface for access to the shared bus by generating control signals to the processor and the 1553 interface and by generating the enable signal to the buffer. The arbitration logic is coupled to the processor, 150, the 1553 interface, 152, the M-bus, 156, and the buffer, 192, and can be viewed as a state machine driven by inputs from the processor and 1553 interface. These inputs are summarized in Table 1, below. The outputs of the arbitration logic are summarized in Table 2, below. Both the inputs and the outputs of the arbitration logic are active low signals.

TABLE 1

Arbitration Logic Inputs

| Signal | Source | Description |
| --- | --- | --- |
| DS_N | Processor | Data strobe |
| MEMCSI_N | M-bus address | Memory chip select |
| CS_N | M-bus address | 1553 inteface chip select |
| DMAR_N | 1553 interface | Memory access request |
| DMACK_N | 1553 interface | Memory access acknowledge |

TABLE 2

Arbitration Logic Outputs

| Signal | Destination | Description |
| --- | --- | --- |
| DMAG_N | 1553 interface | Access granted |
| DTACK_N | Processor | Data acknowledge: 0 = ACK, 1 = Hold |
| SHBE_N | Buffer | Buffer enable |

The inputs to the arbitration logic are received from the processor, the 1553 interface, and by decoding addresses on the M-bus. DS_N is the processor data strobe. It is active when the processor is executing a memory access cycle. MEMCSI_N is the memory chip select signal. It is active when the processor has requested memory access in the address range which has been mapped to the shared memory. In addition to serving as an input to the arbitration logic, this signal is passed through the 1553 interface to generate the shared bus memory control signal SHCS_N. CS_N is the 1553 interface chip select signal which is used to select the internal registers of the 1553 interface, allowing them to be accessed by the processor via the shared bus. DMAR_N is the direct memory access request signal used by the 1553 interface to request access to shared memory via the shared bus. DMACK_N is the direct memory acknowledgment signal from the 1553 interface indicating that it is using the shared bus to access shared memory.

The outputs of the arbitration logic are sent to the processor, the 1553 interface, and the shared buffer. DMAG_N is the direct memory access granted signal which indicates to the 1553 interface that it has been granted access to the shared bus. DTACK_N is the data acknowledge signal to the processor. If active, the processor is allowed access to shared memory. If DTACK_N is inactive, processor wait states are generated to stall the processor until the shared bus becomes available. SHBE_N is the shared buffer enable signal. When active, the shared buffer is enabled and the M-bus is coupled to the SH-bus.

At a high level, the rules for resolving conflicts can be summarized as follows:

1) The 1553 interface has priority over the processor. Simultaneous requests will be resolved in favor of the 1553 interface.
2) If the processor is active on the shared bus, and the 1553 interface requests access, the processor must complete its memory cycle before relinquishing control to the 1553 interface. After the current cycle, the 1553 interface is given control.
3) If the 1553 interface is active on the shared bus, the processor is held off until the 1553 interface relinquishes control.
4) While the 1553 interface is accessing the shared bus, the processor is inhibited from accessing that portion of the operand bus's address space which is mapped to the shared memory. Access to the remainder of the operand bus's address spaced in not affected.
5) The arbitration logic never affects the processor's operand bus control signals.
6) The arbitration logic does not prohibit additional arbitration logic for a dual rate 1773 or a second 1553/1773 interface connected externally to the bus.

Figure 5:
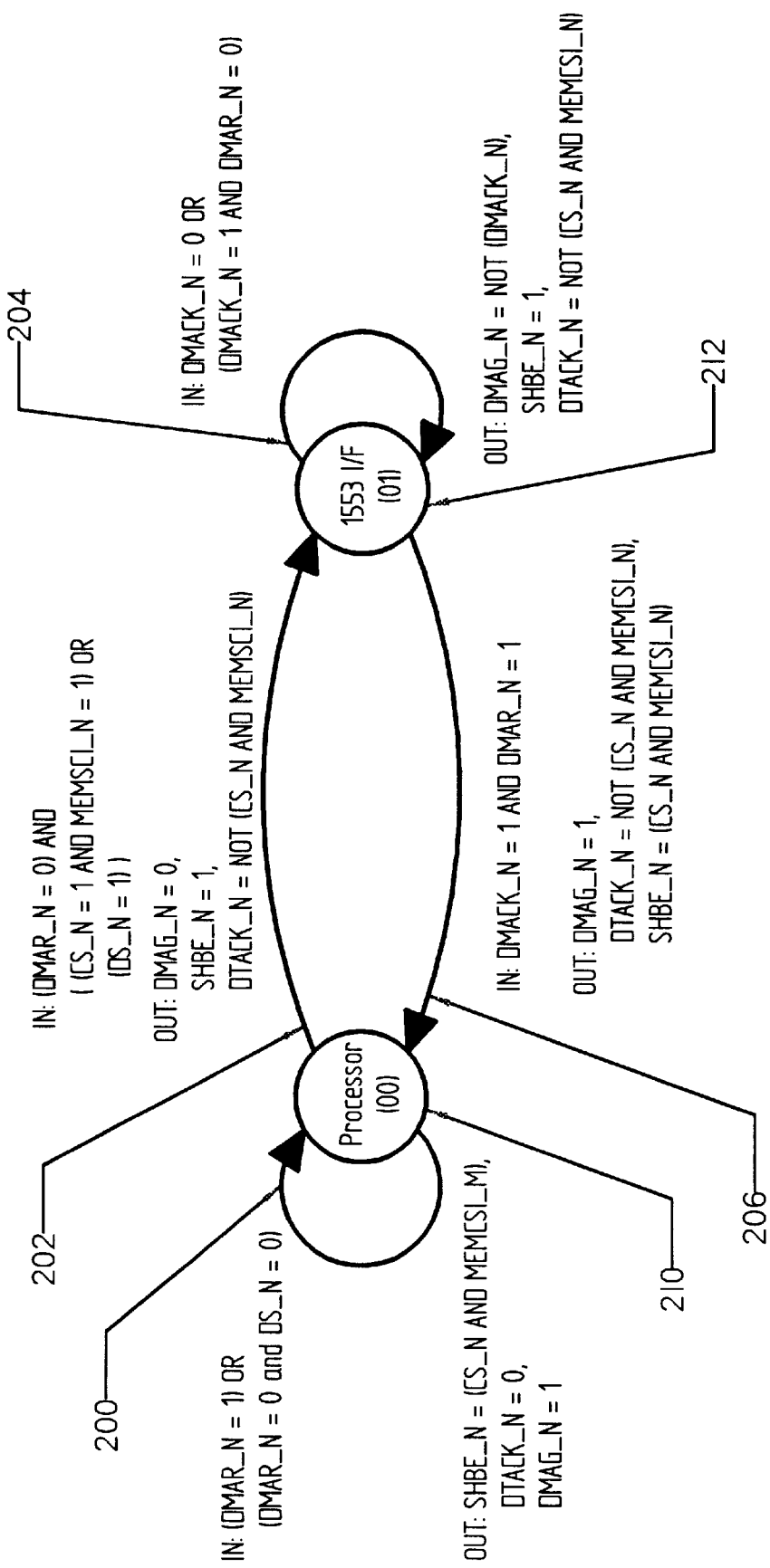
FIG. 5 is a state transition diagram for the control logic of the invention.

The detailed implementation of these rules is handled by a state machine modeled in FIGS. 5 and 6. FIG. 5 illustrates the state machine as a state transition diagram with the circles representing states and the arrows representing transitions. The "IN" labels on the arrows indicate the events which cause the transition to occur. These events are changes in input signals or in combinations of input signals. The "OUT" labels indicate the output signals which are generated as a result of the transition. FIG. 6 represents the same state machine in tabular form. The possible current states appear on the left, followed by the combinations of inputs which trigger a transition, followed by the state which results from the transition, concluding with the outputs generated. FIGS. 5 and 6 are logically equivalent and will both be used in the following discussion of the logic.

In the preferred embodiment, the present invention is modeled as a state machine with two possible states, 210 and 212, and four possible transitions, 200, 202, 204, and 206. In some cases a transition corresponds to a single possible event and in others is corresponds to two or more possible events which are handled in the same manner. The two states correspond to which of the processor or the 1553 interface has access to the bus and are distinguished by requiring a clock cycle to transition between them. The initial state for the arbitration logic at power up is "Processor (00)", 210.

Transition 200 corresponds to three possible events. The first is that DMAR_N, CS_N, and MEMCSI_N have all become inactive. This indicates that neither the processor nor the 1553 interface is requesting access to the shared bus. This corresponds to the first row of FIG. 6. The shared buffer is not enabled, no wait states are generated for the processor, and the 1553 grant signal is inactive. The arbitration logic is essentially idle. The second possible event is that the processor has requested access to the shared bus (either CS_N or MEMCSI_N active), and 1553 interface is not requesting access (DMAR_N inactive). This corresponds to rows 2 and 3 of FIG. 6. The shared buffer is enabled, no wait states are generated for the processor, and the 1553 grant signal is inactive. This is the normal access mode for the processor to use the shared buffer. The third possible event is that the processor is actively accessing the shared bus (DS_N active and either CS_N or MEMCSI_N is active) and the 1553 interface has requested access to the shared bus (DMAR_N active). This is rows 4 and 5 of FIG. 6. In this case the 1553 interface will be held off until the processor completes its current cycle (DS_N deactivated).

Transition 202 corresponds to two possible events. The first, row 6 of FIG. 6, is that the 1553 interface has requested access to the shared bus (DMAR_N active) and the processor is not requesting access (CS_N and MEMCSI_N inactive). The second event, rows 7 and 8, is that both the 1553 interface and the processor are requesting access (DMAR_N active and either CS_N or MEMCSI_N active) but the processor is not actively accessing memory (DS_N inactive). In either case, a transition to state "1553 I/F (01), 212, occurs. The 1553 processor is granted access (DMAG_N active), and the shared buffer is disabled (SHBE_N inactive). If the processor is requesting access, wait states are generated (DTACK_N inactive) to stall it.

Transition 204 corresponds to two possible events. The first is that the 1553 interface has requested and been granted the shared bus (DMAR_N active) but has not yet acknowledged the grant (DMACK_N inactive), rows 9–11 of FIG. 6, and the second is that the 1553 has been granted and has acknowledge the grant of the shared bus (DMACK_N active), rows 12–14 of FIG. 6. In both cases the shared buffer is disabled (SHBE_N inactive). If the processor is requesting access (CS_N or MEMCSI_N active) wait states will be generated to stall it (DTACK_N inactive). The access grant signal (DMAG_N) will be deactivated as soon as the acknowledgment (DMACK_N) is activated.

Transition 206 corresponds to a single event: the 1553 interface is not accessing shared memory (DMACK_N inactive) and is not requesting access (DMAR_N inactive). This is shown in rows 15–17 of FIG. 6. This event occurs when the 1553 interface has completed its access to shared memory. This triggers a transition to state "Processor (00)", 200. The 1553 access grant (DMAG_N) is inactive. The shared buffer will be enabled (SHBE_N active) and wait states will be generated (DTACK_N inactive) if the processor is requesting access to shared memory (CS_N or MEMCSI_N active). The wait state generation will stop after entry into the "Process (00)" state as self-transition 200 is immediately triggered.

In the preferred embodiment, a preference, or priority, is given to the 1553 interface for use of shared memory by the selection of the input signals to the control logic and by the rules implemented in the control logic. Because the processor's Data Strobe is used as an input to inhibit a transition to the 1553 active state, and because the Data Strobe signal automatically deactivates after every memory cycle, the processor can hold the shared bus for no more than one cycle. This allows fast access by the 1553 interface in order to respond to external requests. However, the 1553 interface will retain the use of the shared bus for as long as its acknowledgment signal, DMACK_N, is active. Since DMACK_N is deactivated only after completion of an entire data transfer to/from the system bus, the 1553 interface can process the request without interruption. This combination of feature allows the 1553 interface to respond quickly to asynchronous external requests over the system bus and to maintain high throughput rates during the transfer.

It should be noted that the input signal CS_N is used to access the internal registers of the 1553 interface. If this capability is not required, this signal can be eliminated from the above logic resulting in an arbitration method which handles only memory access. Further, it could be generalized to be an enable signal for any other resource connected to the shared bus which is accessible via a logical memory address. This method is also easily extended to the use of three or more signals of the same type.

As mentioned above, this arbitration method has the advantage of functioning with either the internal processor or an external processor coupled to the M-bus. Because all lines of the M-bus are available as pinouts, the necessary addresses can be generated and the data read or written by a device external to the processor. The signals coupled to the processor (DS_N and DTACK_N) are provided an pinouts of the ESN ASIC. If all of these signals are coupled to an external device, which uses them for the same function as the internal processor, the arbitration logic will operate in the same manner as with the internal processor.

While the preferred form of the invention has been disclosed above, alternative methods of practicing the invention are readily apparent to the skilled practitioner. The above description of the preferred embodiment is intended to be illustrative only and not to limit the scope of the invention.

We claim:

1. In a digital electronic device where there is contention for access to a shared memory resource, a method for arbitrating the contention comprising
    (a) providing a first bus and a second bus;
    (b) providing a first device being a microprocessor device coupled to at least one of said buses;
    (c) providing a second device being a logic device coupled to at least one of said buses;

(d) providing control logic means;

(e) said control logic means having the capability to generate a buffer enable signal;

(f) providing a buffer coupled to said first bus and said second bus, responsive to said buffer enable signal whereby when said buffer is enabled, said first bus and said second bus are electrically coupled;

(g) providing a processor request signal and a processor active signal from said microprocessor to said control logic means, said processor request signal being generated by decoding the address values on one of said buses connected to said processor and matching said address values against a specified address range;

(h) providing a logic device request signal and a logic device active signal from said logic device to said control logic means;

(i) providing a processor inhibit signal from said control logic means to said microprocessor, said microprocessor responsive to said inhibit signal whereby said microprocessor will not access said shared memory while said inhibit signal is active; and (j) providing a logic device grant signal from said control logic means to said logic device, said logic device responsive to said logic device grant signal whereby said second logic device will not access said shared memory unless said grant signal is active;

wherein said control logic implements the following rules to generate said buffer enable, processor inhibit, and logic device grant signals:

(i) said buffer enable signal is active if access has been granted to said microprocessor;

(ii) said processor inhibit signal is active if access has been granted to said logic device and said processor request signal is active;

(iii) said logic device grant signal is active if said logic device request signal is active and not both of said processor request and said processor active signals are active; and wherein said first bus, said second bus, said microprocessor, said logic device, said control logic means and said buffer are all contained within a single integrated circuit having plural external interface pins and said processor active signal is coupled to at least one of said interface pins and all address lines of said bus which is decoded to generate said processor request signal are available on plural of said interface pins and further comprising means for selectively disabling said microprocessor wherein said control logic is responsive to said processor request signal and said address values generated externally to said integrated circuit.

* * * * *